United States Patent
Komarek et al.

(10) Patent No.: US 11,271,833 B2
(45) Date of Patent: Mar. 8, 2022

(54) TRAINING A NETWORK TRAFFIC CLASSIFIER USING TRAINING DATA ENRICHED WITH CONTEXTUAL BAG INFORMATION

(71) Applicant: Cisco Technology, Inc., San Jose, CA (US)

(72) Inventors: Tomas Komarek, Frydek Mistek (CZ); Martin Vejman, Litomysl (CZ); Petr Somol, Marianske Lazne (CZ)

(73) Assignee: Cisco Technology, Inc., San Jose, CA (US)

( * ) Notice: Subject to any disclaimer, the term of this patent is extended or adjusted under 35 U.S.C. 154(b) by 1172 days.

(21) Appl. No.: 15/790,402

(22) Filed: Oct. 23, 2017

(65) Prior Publication Data

US 2019/0123982 A1    Apr. 25, 2019

(51) Int. Cl.
| | |
|---|---|
| H04L 12/26 | (2006.01) |
| H04L 43/062 | (2022.01) |
| H04L 29/06 | (2006.01) |
| G06N 20/00 | (2019.01) |
| H04L 41/16 | (2022.01) |
| H04L 43/026 | (2022.01) |

(52) U.S. Cl.
CPC .......... *H04L 43/062* (2013.01); *G06N 20/00* (2019.01); *H04L 41/16* (2013.01); *H04L 43/026* (2013.01); *H04L 63/1425* (2013.01); *H04L 63/1458* (2013.01)

(58) Field of Classification Search
CPC ............. H04L 63/1425; H04L 63/1416; H04L 63/1408
See application file for complete search history.

(56) References Cited

U.S. PATENT DOCUMENTS

| | | | |
|---|---|---|---|
| 9,288,220 B2 | 3/2016 | Raugas et al. | |
| 10,187,412 B2* | 1/2019 | Bartos | H04L 63/1425 |
| 10,785,247 B2* | 9/2020 | Nikolaev | H04L 43/0876 |
| 2008/0025568 A1* | 1/2008 | Han | G06K 9/4642 382/103 |
| 2015/0281838 A1* | 10/2015 | Hershey | G06K 9/00973 381/71.4 |
| 2016/0112442 A1* | 4/2016 | Sourek | H04L 63/1416 726/23 |
| 2017/0063892 A1* | 3/2017 | Bartos | H04L 63/1425 |

(Continued)

OTHER PUBLICATIONS

Elkan et al., "Learning Classifiers from Only Postive and Unlabeled Data", Aug. 2008, pp. 213-220 (Year: 2008).*

(Continued)

*Primary Examiner* — Paulinho E Smith
(74) *Attorney, Agent, or Firm* — Behmke Innovation Group LLC; Kenneth J. Heywood; Jonathon P. Western

(57) ABSTRACT

In one embodiment, a device groups feature vectors representing network traffic flows into bags. The device forms a bag representation of a particular one of the bags by aggregating the feature vectors in the particular bag. The device extends one or more feature vectors in the particular bag with the bag representation. The extended one or more feature vectors are positive examples of a classification label for the network traffic. The device trains a network traffic classifier using training data that comprises the one or more feature vectors extended with the bag representation.

17 Claims, 11 Drawing Sheets

(56) References Cited

U.S. PATENT DOCUMENTS

| | | | |
|---|---|---|---|
| 2017/0063893 | A1 | 3/2017 | Franc et al. |
| 2017/0134404 | A1 | 5/2017 | Machlica et al. |
| 2018/0063163 | A1* | 3/2018 | Pevny ................... H04L 67/02 |
| 2018/0167404 | A1* | 6/2018 | Machlica ............... H04L 43/16 |
| 2018/0212992 | A1* | 7/2018 | Nikolaev ............... H04L 67/306 |
| 2019/0020671 | A1* | 1/2019 | Komarek ............... G06N 20/00 |
| 2019/0123982 | A1* | 4/2019 | Komarek ............... H04L 43/026 |
| 2019/0190928 | A1* | 6/2019 | Anderson ............ H04L 63/1425 |
| 2019/0199739 | A1* | 6/2019 | Anderson ............ H04L 63/1458 |
| 2020/0162339 | A1* | 5/2020 | Vejman ................ H04L 41/145 |
| 2020/0186547 | A1* | 6/2020 | Bartos ................... G06N 20/00 |
| 2020/0236131 | A1* | 7/2020 | Vejman ................ G06N 3/0445 |

OTHER PUBLICATIONS

Bunescu et al., "Multiple Instance Learning for Sparse Positive Bags", Jun. 2007, Proceedings of the 24th Annual Intl. Conf. on Machine Learning, pp. 1-8. (Year: 2007).*

Anderson, et al., "Identifying Encrypted Malware Traffic with Contextual Flow Data", AISec '16 Proceedings of the 2016 ACM Workshop on Artificial Intelligence and Security, pp. 35-46, 2016, ACM.

Bartos, et al., "Learning Invariant Representation for Malicious Network Traffic Detection", Frontiers in Artificial Intelligence and Applications, 8 pages, 2016, IOS Press.

* cited by examiner

TRAINING A NETWORK TRAFFIC CLASSIFIER USING TRAINING DATA ENRICHED WITH CONTEXTUAL BAG INFORMATION

TECHNICAL FIELD

The present disclosure relates generally to computer networks, and, more particularly, to training a network traffic classifier using training data enriched with contextual bag information.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

Beyond the various types of legitimate application traffic in a network, some network traffic may also be malicious. For example, some traffic may seek to overwhelm is a service by sending a large number of requests to the service. Such attacks are also sometimes known as denial of service (DoS) attacks. Other forms of malicious traffic may seek to exfiltrate sensitive information from a network, such as credit card numbers, trade secrets, and the like. Typically, such traffic is generated by a client that has been infected with malware. Thus, further types of malicious network traffic include network traffic that propagate the malware itself and network traffic that passes control commands to already infected devices.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
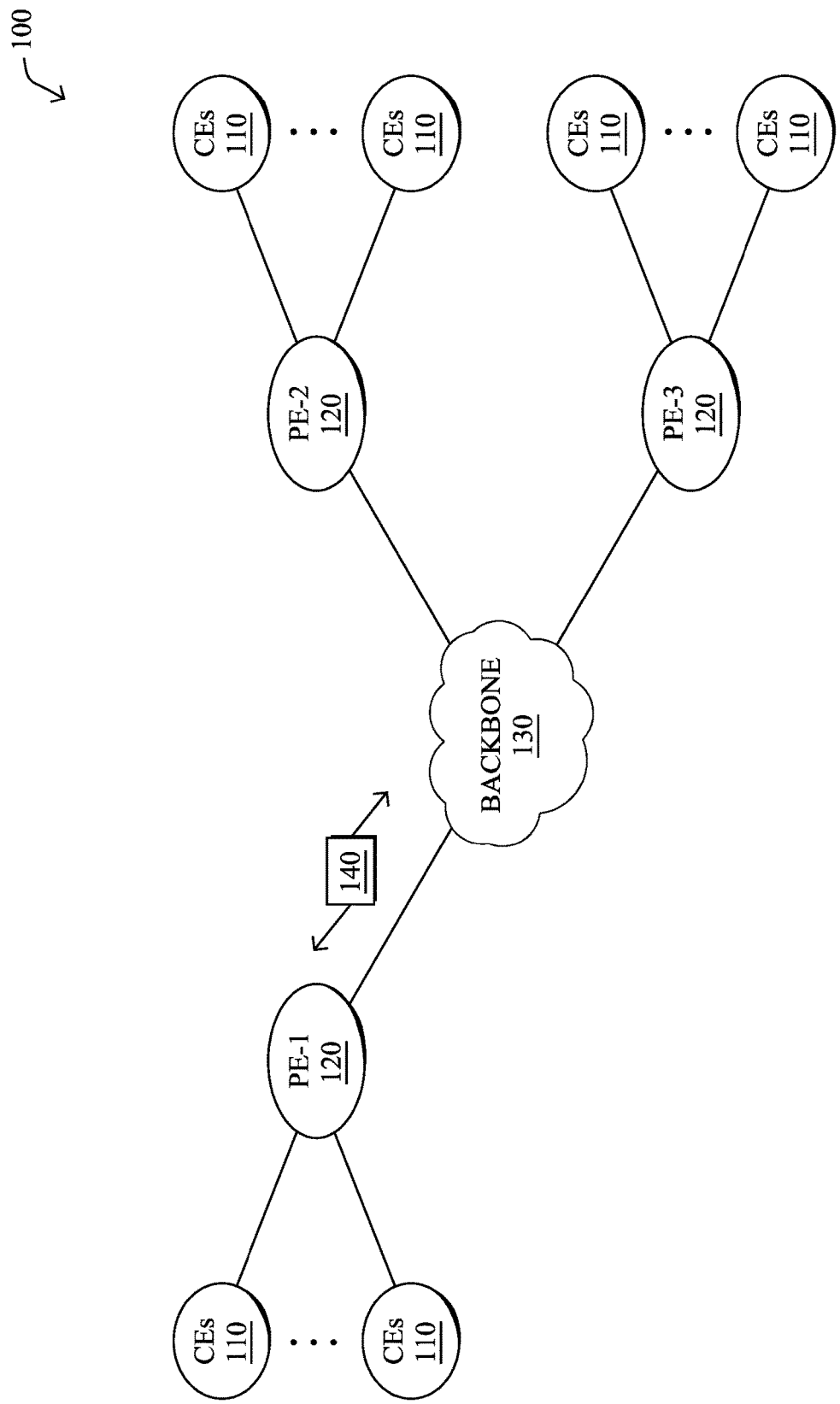
FIGS. 1A-1B illustrate an example communication network.

According to one or more embodiments of the disclosure, a device groups feature vectors representing network traffic flows into bags. The device forms a bag representation of a particular one of the bags by aggregating the feature vectors in the particular bag. The device extends one or more feature vectors in the particular bag with the bag representation. The extended one or more feature vectors are positive examples of a classification label for the network traffic. The device trains a network traffic classifier using training data that comprises the one or more feature vectors extended with the bag representation.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate is over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to is the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
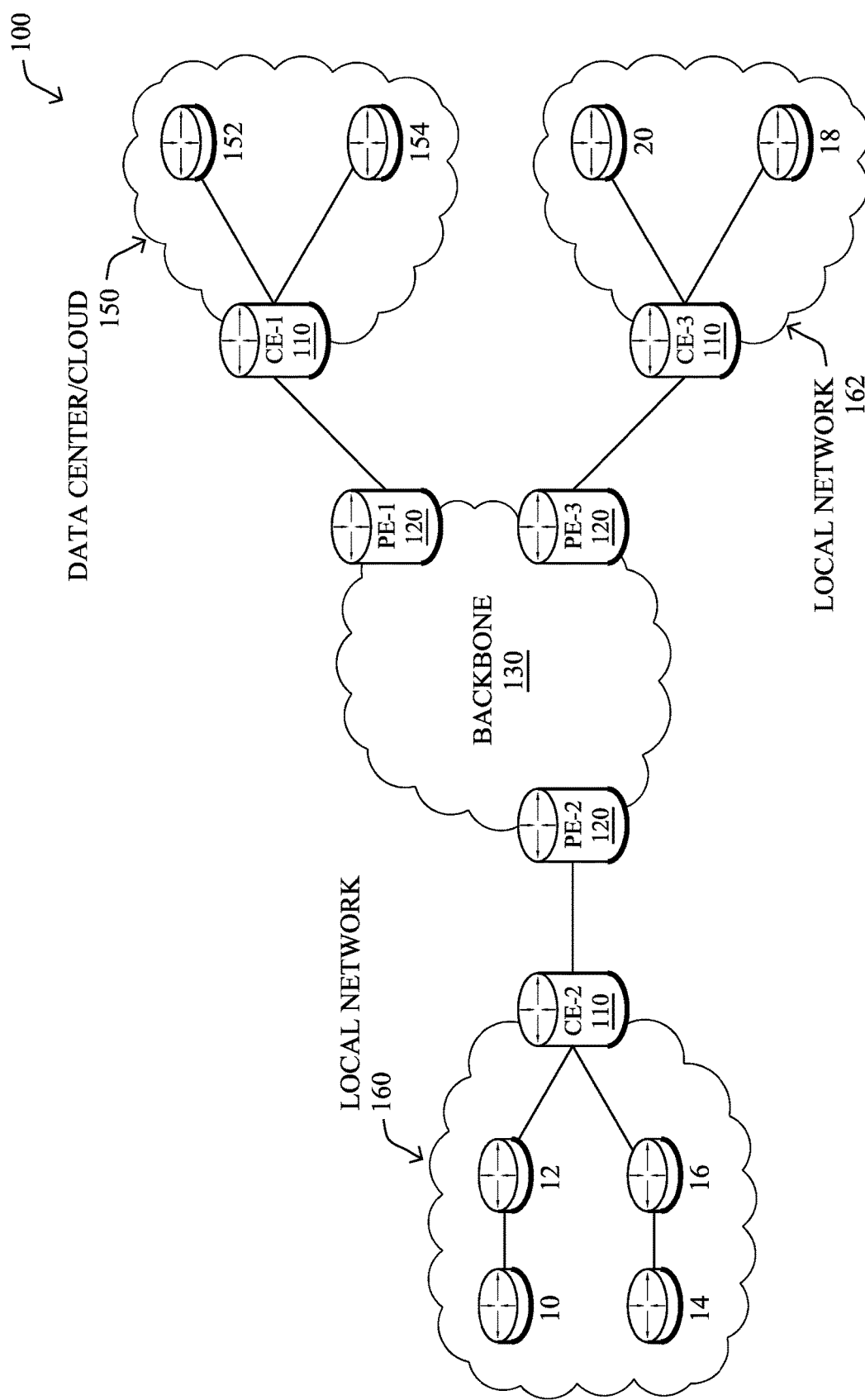

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, is such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or is humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
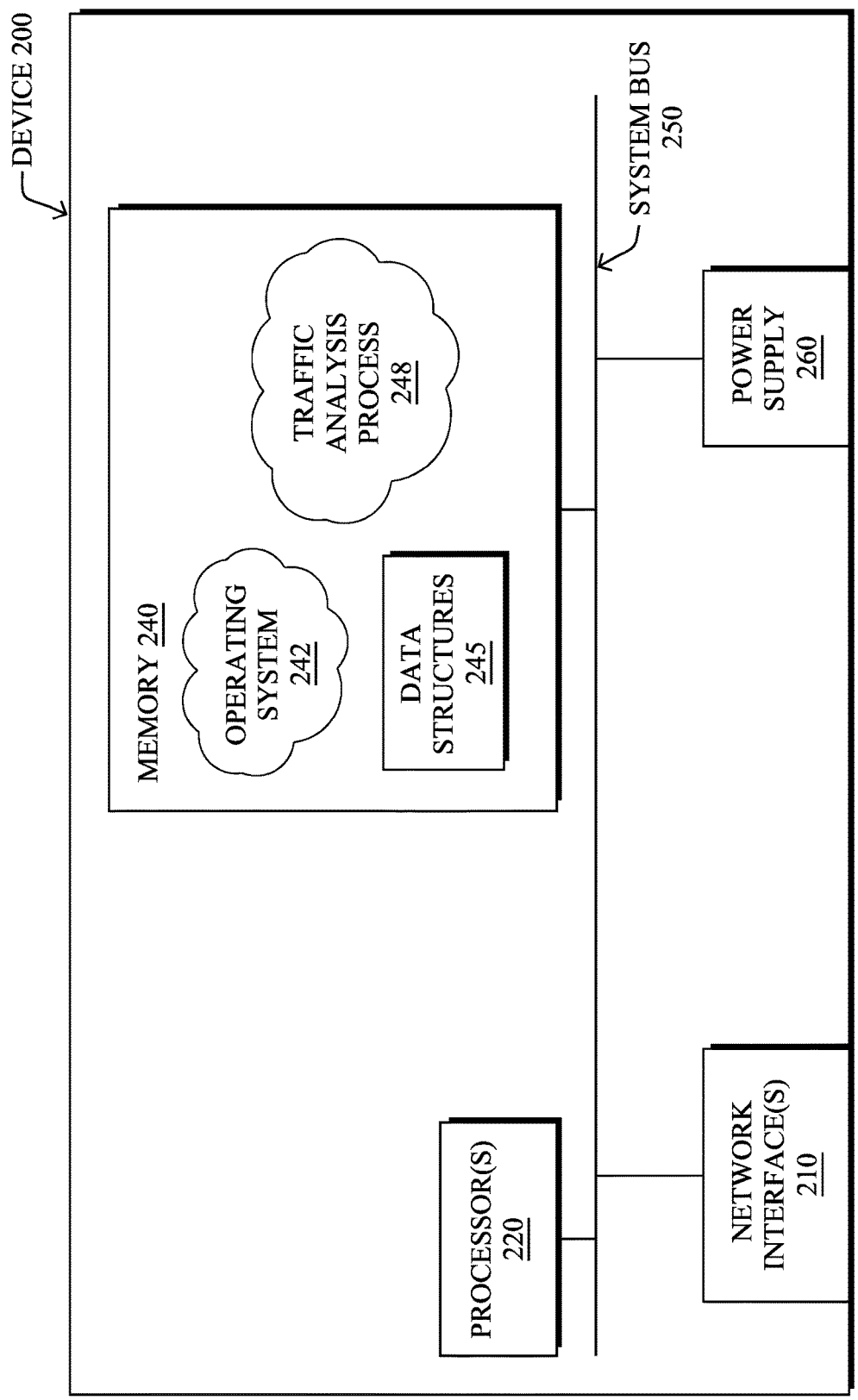
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and is manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a traffic analyzer process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Traffic analyzer process 248 includes computer executable instructions that, when executed by processor(s) 220, cause device 200 to analyze available information about a traffic flow or set of traffic flows, to discern the traffic flow type(s) of the flow(s) under analysis. In some embodiments, traffic analyzer process 248 may discern between different types of benign traffic flows, such as the various benign applications associated with the flows that may be deployed in the network. In further embodiments, traffic analyzer process 248 may discern between benign and malicious traffic flows and may even identify the specific type of a malicious flow (e.g., the specific family of malware associated with the flow).

Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, traffic analyzer process 248 may analyze traffic flow data to detect anomalous or otherwise undesirable behaviors (e.g., malfunctioning devices, misconfigured devices, etc.), traffic pattern changes (e.g., a group of hosts begin sending significantly more or less traffic), or the like.

According to various embodiments, traffic analyzer process 248 may employ any number of machine learning techniques, to assess a given traffic flow in the network. In general, machine learning is concerned with the design and the development of techniques that receive empirical data as input (e.g., traffic data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, traffic analyzer process 248 can use the model M to classify new data points, such as information regarding new traffic flows in the network. Often, M is a statistical model, and the cost function is inversely proportional to the likelihood of M, given the input data.

In various embodiments, traffic analyzer process 248 may employ one or more supervised, unsupervised, or semi-supervised machine learning models to analyze traffic flow data. Generally, supervised learning entails the use of a training dataset, which is used to train the model to apply labels to the input data. For example, the training data may include sample traffic data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled is training data.

Example machine learning techniques that traffic analyzer process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, traffic analyzer process 248 may assess the captured traffic data on a per-flow basis. In other embodiments, traffic analyzer process 248 may assess traffic data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
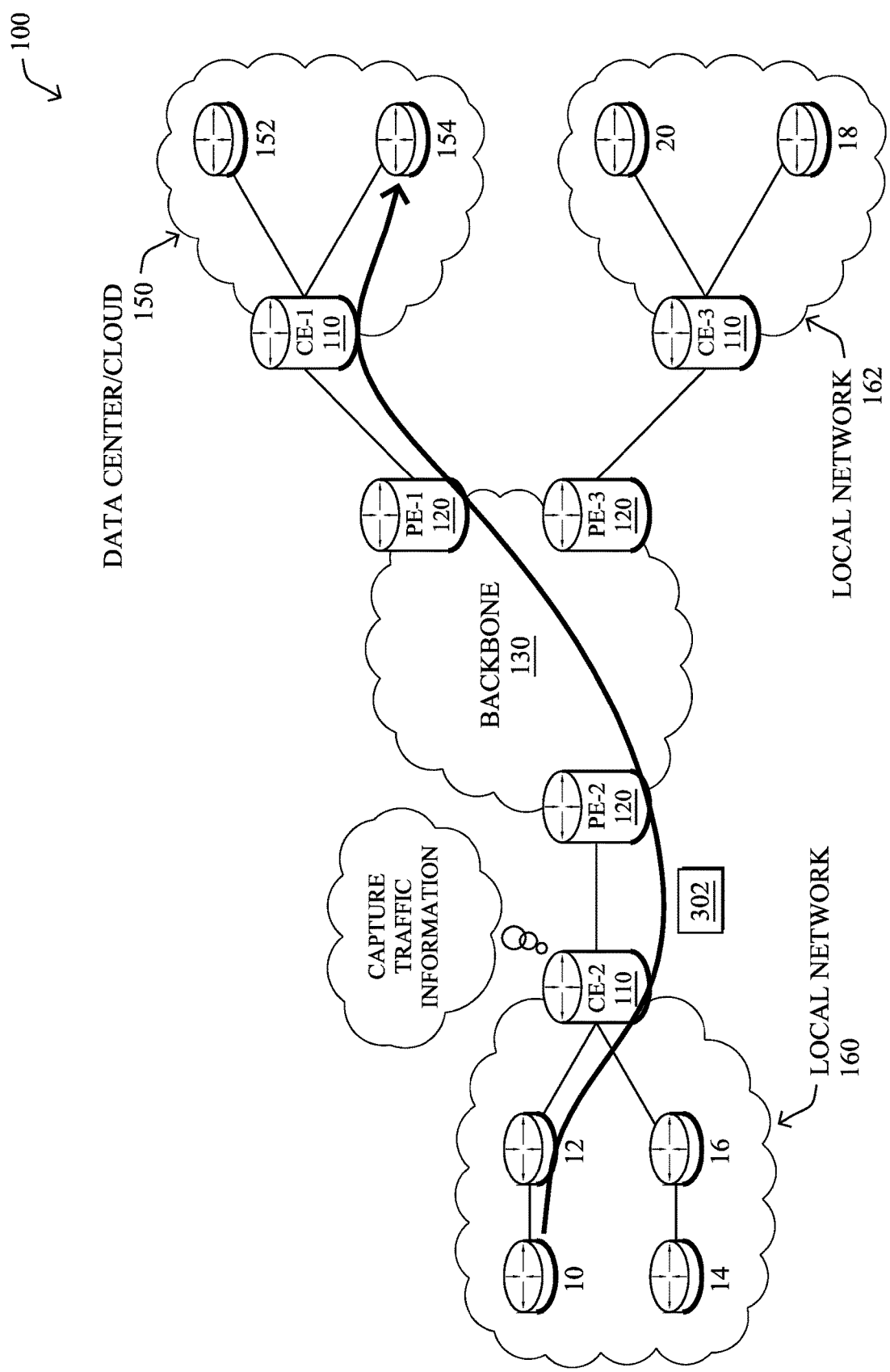
FIG. 3 illustrates an example of a network device capturing traffic data.

As shown in FIG. 3, various mechanisms can be leveraged to capture information is about traffic in a network. For example, consider the case in which client node 10 initiates a traffic flow with remote server 154 that includes any number of packets 302. Any number of networking devices along the path of the flow may analyze and assess packet 302, to capture traffic data regarding the traffic flow. For example, as shown, consider the case of edge router CE-2 through which the traffic between node 10 and server 154 flows. While the packets 302 flow through edge router CE-2, router CE-2 may capture traffic data regarding the flow. Notably, traffic flows can be monitored in many cases through the use of a tap or Switch Port Analyzer (SPAN).

In some embodiments, a networking device may analyze packet headers, to capture information about the traffic flow. For example, router CE-2 may capture the source address and/or port of host node 10, the destination address and/or port of server 154, the protocol(s) used by packet 302, or other header information by analyzing the header of a packet 302. In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the traffic data may also compute any number of statistics or metrics regarding the traffic flow. For example, CE-2 may determine the start time, end time, duration, packet size(s), the distribution of bytes within a flow, etc., associated with the traffic flow by observing packets 302.

In the specific case of encrypted traffic, the networking device that captures the traffic data may also be a proxy device, in some embodiments. For example, CE-2 or another intermediary device may act as a man-in-the-middle between endpoints, to intercept the encryption credentials used and simulate responses from each respective node. In doing so, the device may be able to decrypt and analyze the payloads of the packets. Alternatively, in further embodiments, the device may simply capture header is information from encrypted traffic, such as Transport Layer Security (TLS) header information.

Figure 4:
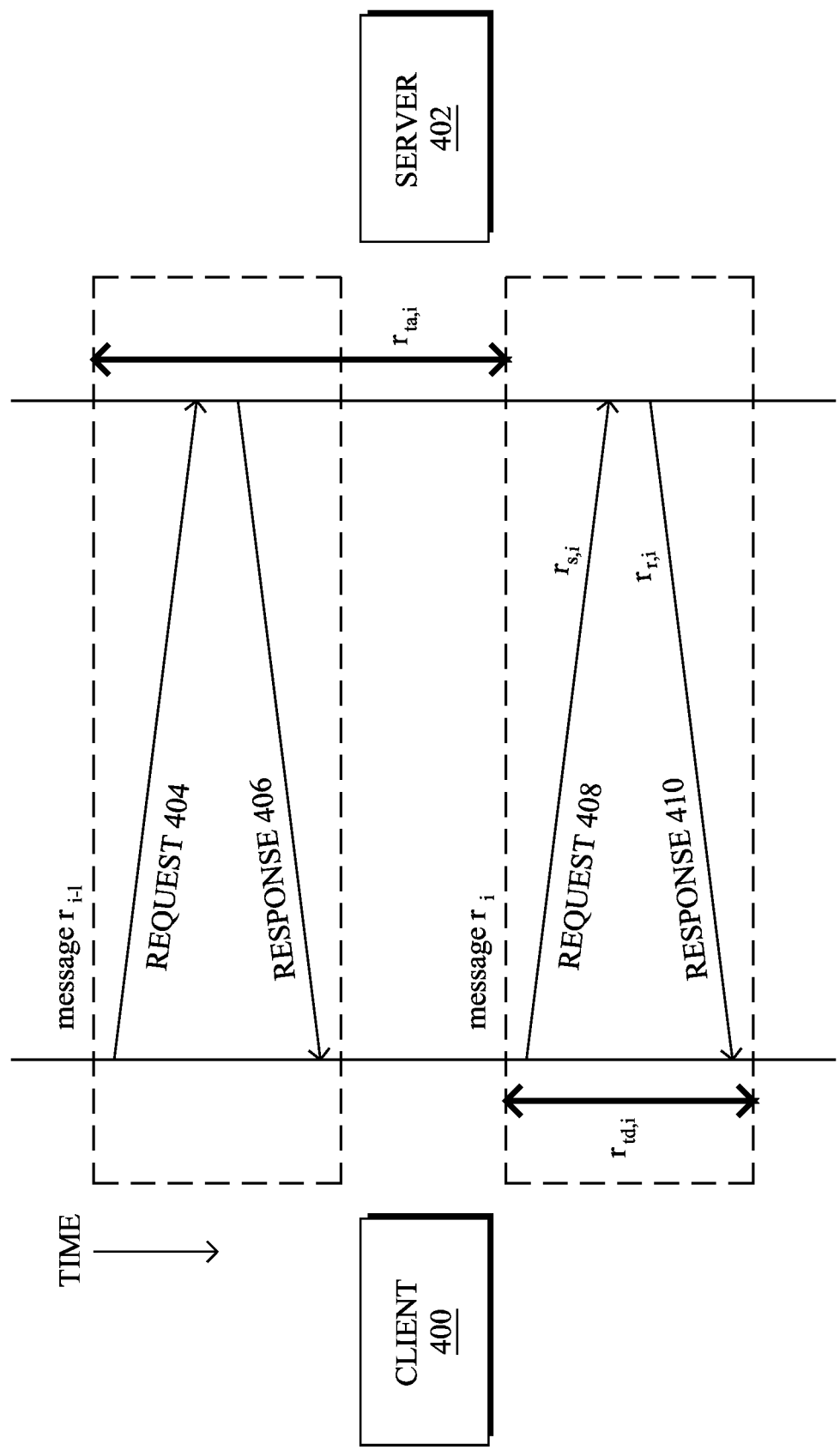
FIG. 4 illustrates an example of observed messages between a client and a server.

FIG. 4 illustrates an example of observed messages exchanged between a client 400 and a server 402, in accordance with various embodiments herein. As shown, client 400 and server 402 may exchange any number of messages that may comprise a request and/or a response. For example, individual messages/traffic exchanged between client 400 and server 402 may include, but are not limited to, HTTP(S) request-response pairs, a single TCP or UDP communication, a NetFlow message, or any other type of network traffic.

An intermediate device located along the path between client 400 and server 402 (e.g., a CE router 110, a cloud service device, a NetFlow or IPFIX generation appliance, etc.) may capture various traffic data regarding the traffic between client 400 and server 402. Notably, such an intermediate device may capture traffic data regarding the $i^{th}$ message exchange, $r_i$, between client device 400 and server 402. Message $r_i$ may comprise a request 408 sent from client 400 to server 402 and a response 410 sent from server 402 to client 400. Similarly, the prior message, $r_{i-1}$, may include a request 404 and a response 406.

The intermediate device between client 400 and server 402 may capture any or all of the following traffic data characteristics regarding message The number of bytes in request 408 ($r_{s,i}$), The number of bytes in response 410 ($r_{r,i}$), The time duration of the request-response (R-R) loop of message $r_i$($r_{td,i}$), The inter-arrival time between when client 400 sent request 404 of message and when client 400 sent request 408 of message $r_i$ ($r_{ta,i}$), and/or Header information or any other information available from requests or responses 404-410, themselves.

The intermediate device between client 400 and server 402 may also capture other is features regarding the traffic, as well, in further embodiments.

As noted above, various characteristic/features of network traffic flows can be used to assess the behavior of the traffic and the underlying applications associated with the traffic. In particular, machine learning can be leveraged to assess whether the traffic is indicative of malware infections, misbehaving endpoints, and other network conditions that may require remediation. However, training a model, such as a traffic classifier, for use in a traffic analyzer is itself a challenging task. Notably, how the model is trained can significantly affect the performance of the model.

In addition to determining how to train a machine learning model, the training data used can also greatly affect the efficacy of the model. For example, considerations such as the proportion of example training data per class label (e.g., examples of malicious flows, etc.), how close the training samples are to the boundary between labels, and the like, can greatly affect how well the model is able to accurately assess traffic in the network to which the model is deployed.

As would be appreciated by one skilled in the art of machine learning, bagging is a bootstrap aggregation technique that can be used to improve the efficacy of a trained model. In general, bagging entails using sampling with replacement on an original training dataset to generate n-number of training datasets. In turn, the different training datasets can then be used to train an ensemble of models whose outputs can be combined. For example, in the case of regression, the outputs can be averaged. Similarly, in the case of classification, a voting strategy can be used to combine the classifier outputs into a final classification.

Training a Network Traffic Classifier Using Training Data Enriched with Contextual Bag Information The techniques herein introduce a procedure to utilize contextual bag feature extraction for the training of network traffic flow classifiers. In some aspects, the is techniques herein allow for the use of a large volume of training samples, while still leveraging contextual bag information. Preliminary testing of the techniques herein indicate that they result in a classifier that exhibits better performance in terms of precision and recall over other techniques such as single and multiple instance learning.

Specifically, according to one or more embodiments of the disclosure as described in detail below, a device groups feature vectors representing network traffic flows into bags. The device forms a bag representation of a particular one of the bags by aggregating the feature vectors in the particular bag. The device extends one or more feature vectors in the particular bag with the bag representation. The extended one or more feature vectors are positive examples of a classification label for the network traffic. The device trains a network traffic classifier using training data that comprises the one or more feature vectors extended with the bag representation.

Illustratively, the techniques described herein may be performed by hardware, software, and/or firmware, such as in accordance with the traffic analyzer process 248, which may include computer executable instructions executed by the processor 220 (or independent processor of interfaces 210) to perform functions relating to the techniques described herein.

Figure 5A:
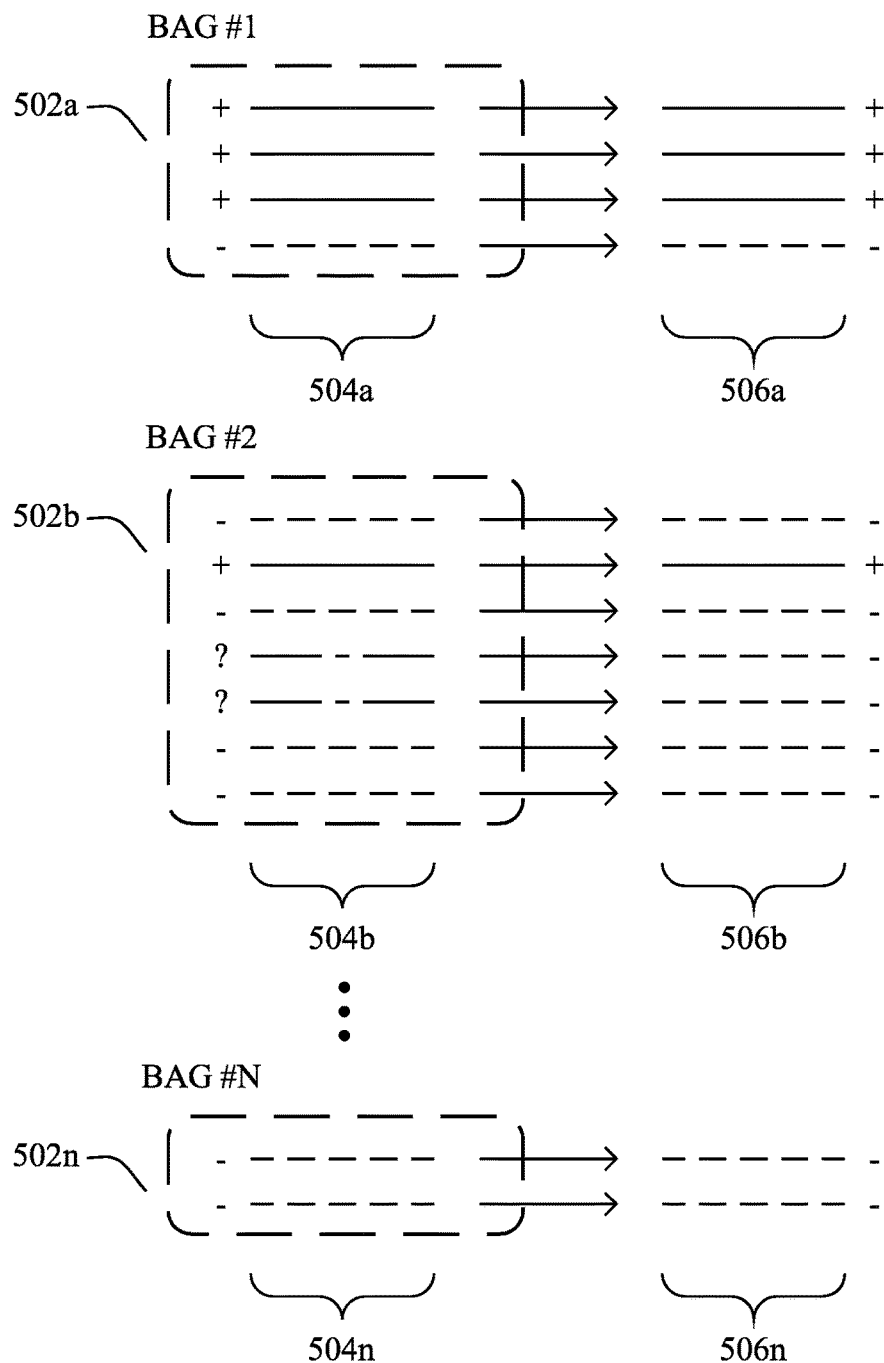
FIGS. 5A-5C illustrate examples of forming training data for a classifier.
Figure 5B:
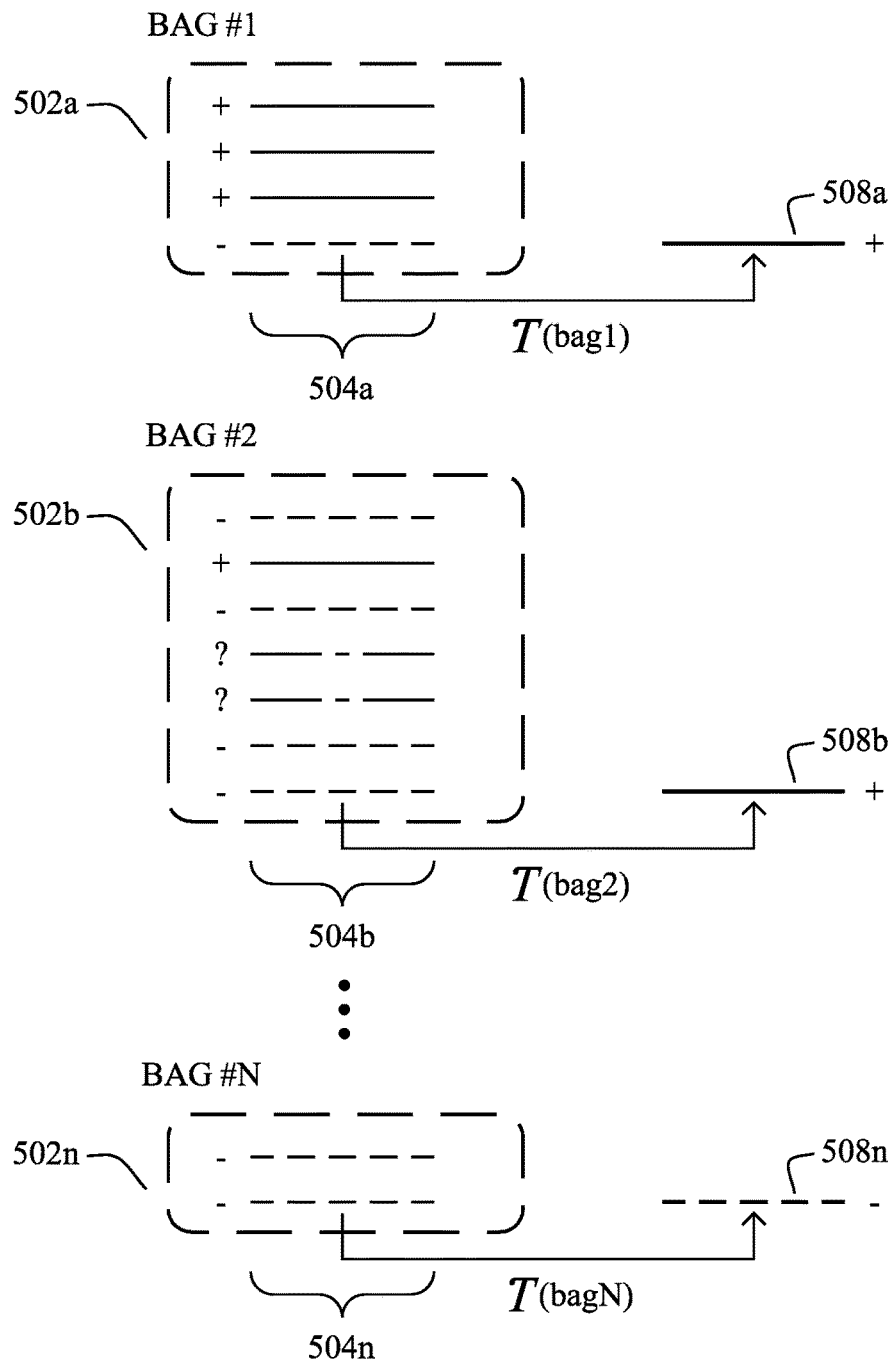
Figure 5C:
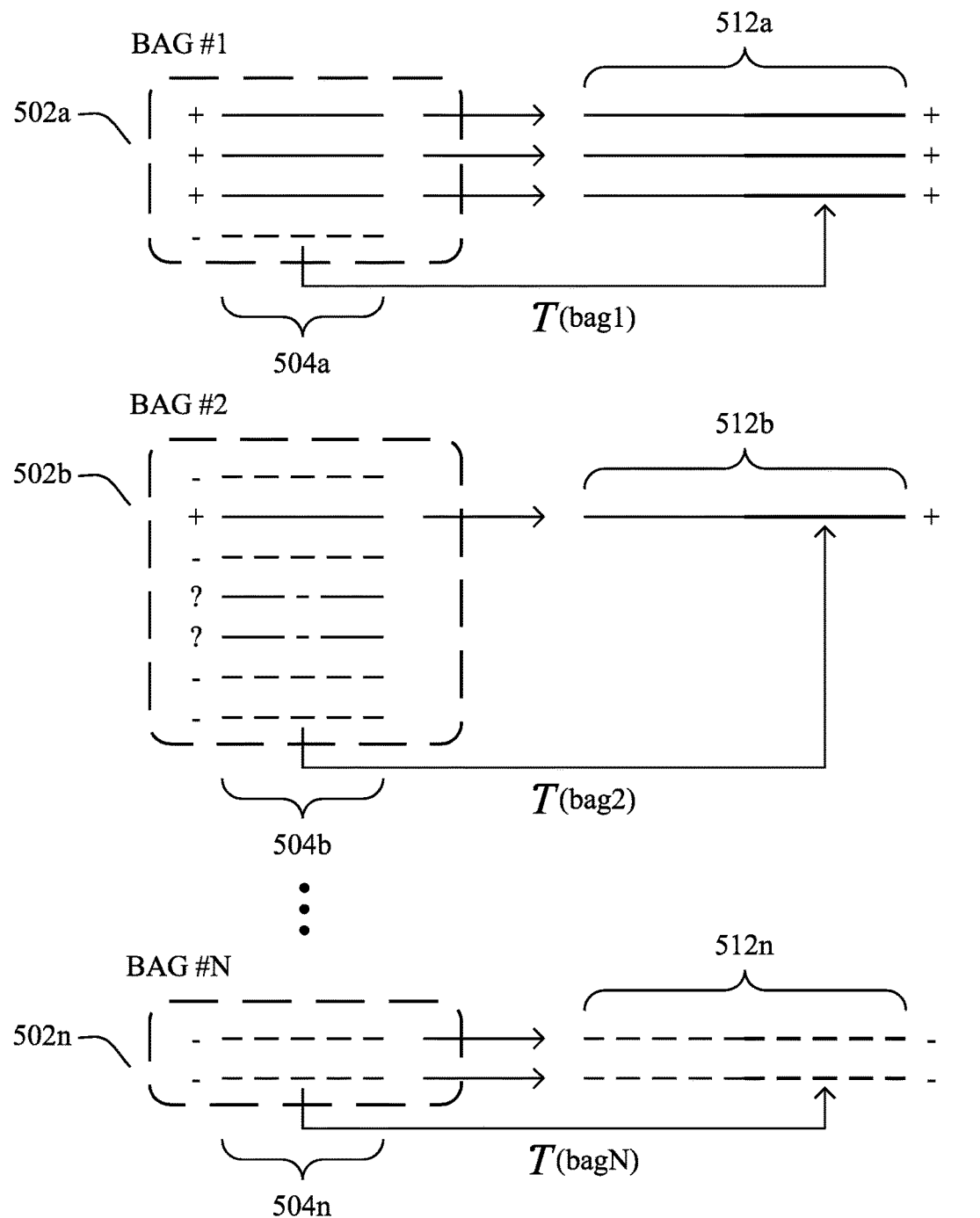

Operationally, FIGS. 5A-5C illustrate examples of forming training data for a classifier, according to various embodiments. In example 500 in FIG. 5A, the system may use single instance learning, to train the traffic analyzer. Notably, assume that the system has obtained a training dataset of features/characteristics of network traffic flows, as described above. In various embodiments, the system may then convert this information into feature vectors 504 that represent the different traffic flows. In turn, the system may group the feature vectors 504 into N-number of bags 502 (e.g., a first bag 502a that comprises feature vectors 504a, a second bag 502b that comprises feature vectors 504b, etc.).

The system may use any number of criteria, to form bags 502. In one embodiment, the system may group the feature vectors 504 into their corresponding bags 502, based on one or more common characteristics/features of the vectors. For example, each feature vector 504 in a given bag 502 may have the same host name, targeting domain, and time window. As described further below, other groupings are also possible, including the use of sub-bags to distinguish between feature vectors that share some characteristics, but not others (e.g., flows from the same user with different domains, etc.).

Each of the feature vectors 504 may have an associated label, such as being a positive or negative example of a classification label. For example, a feature vector 504 with a '+' symbol may represent a positive example of a malware-related traffic flow. Similarly, a feature vector 504 with a '−' symbol may represent a negative example of the malware-related classification label. In other words, a negative example may itself represent a benign traffic flow. Certain feature vectors 504 may also be labeled as unknown, if the classification of the feature vector is unknown. Such feature vectors 504 are labeled with a "?" symbol.

In the single instance learning case, each feature vector 504 in each bag 502 may be included in the training data used to train a respective classifier. For example, each of feature vectors 504a may be included in the feature data 506a used to train a classifier from bag 502a, etc. In the case of a feature vector 504 having an unknown label, such as some of the feature vectors in bag 502b, these feature vectors 504 may be assigned a negative label for purposes of classifier training.

FIG. 5B illustrates an example 510 of multiple instance learning, in further embodiments. Similar to example 500 in FIG. 5A, the system may represent the observed network traffic flows as feature vectors 504. Also similar to example 500, the system may group these feature vectors 504 into N-number of bags 502. In other words, in example 510, the system may perform the same initial processing of the traffic data, as in example 500.

In contrast to the single instance learning approach in example 500, the system in example 510 may classify the bags 502 of flows, themselves, as opposed to the individual is flows represented in bags 502. More specifically, as shown, it can be assumed that all flows represented by feature vectors 504 in a given bag 502 are related in some way. For example, depending on the grouping criteria used, the feature vectors 504b in bag 502b may all represent flows from the same host, flows between a certain host and domain, all flows targeting one domain, or the like. In general, this approach entails embedding these sets of flows into single feature vectors 508 via a transformation and classifying the new vector representatives with a pre-trained classifier (e.g., random forests or neural networks, etc.) in the new vector space.

As shown, for example, the feature vectors 504a in bag 502a may be transformed using a transformation function $T(bag_n)$ that quantifies the set of feature vectors 504a in bag 502a. For example, the transformation function may calculate the mean, median, minimum, maximum, percentiles, standard deviations, or any other statistical measure of the feature vectors 504a in bag 502a. As a result of this transformation, the feature vectors 504 in a bag 502 may be transformed into a single vector representation 508.

In general, multiple instance learning allows the labeling requirements for each feature vector 502 to be relaxed, in comparison to single instance learning. Notably, only a single flow related to malicious activity needs to be identified in a bag 502, to annotate the whole bag as a positive example of this activity. Additionally, the new vector representatives 508 contain contextual information summarizing the overall bag activity, which improves the classification performance.

However, a side effect of using multiple instance learning is that the number of training samples can be dramatically reduced by the process of grouping flows into bags. For example, as shown, the seven feature vectors 504b in bag 502b may be reduced to a single vector 508b via the transformation. From a learning perspective, this can also reduce the effectiveness of the trained classifier, as the classifier has fewer examples on which to be trained. In the network security domain, this relates especially to positive (i.e., malicious) samples, which are scarce and difficult to collect. Therefore, grouping many positive flows to one bag can be considered to be wasting valuable training is samples.

Another downside of the multiple instance learning approach is that the information about malicious behavior might be suppressed or even lost in the aggregated feature vectors representing the bags. This might happen in bags in which there are far more flows related to background activity than to the malicious behavior, such as in the case of bag 502*b* shown.

According to various embodiments, a further approach that the system can use to train a network traffic classifier entails leveraging the contextual information at the bag level, to enrich the information about the individual flows that is used to train the classifier. This approach assumes that each positive bag contains at least one flow that is identified as malicious. This assumption is stronger compared to multiple instance learning, where no annotation has to be provided on the level of flows, but it is weaker compared to the single instance learning, where all flows have to be labeled. In fact, this version of the labeling assumption often meets the reality that few flows are identified as malicious and the rest is considered to be benign.

FIG. 5C illustrates an example 520 of a bagging approach that enriches the training data with contextual information from the bag level. Similar to the other examples in FIGS. 5A-5B, the system may first convert the characteristics of the traffic flows into feature vectors 504. In turn, the system may group the feature vectors 504 into N-number of bags 502.

In various embodiments, the system may generate the training data with which to train the classifier by first converting the bags into single vectors using a transformation function. For example, as shown, the system may apply the transformation function to the bags 502 as a whole, to form a vector that captures the contextual features of the bag. For example, the transformation may determine the mean, max, percentiles, standard deviation, more complex metrics, or the like, on a per-bag basis.

Using the bag representations from the application of the transformation function to the bags 502, the system may then extend the feature vectors of all malicious flows, in some embodiments. For example, the system may extend each of the positive example is feature vectors 504 (e.g., the vector representations of the malicious traffic flows) with the representation of bag 502*a*, to form training data 512*a*. Similarly, the single positive example in bag 502*b* may be extended with the bag-level representation of 502*b*, to form training data 512*b*.

In the case of bags that comprise only negative examples, such as bag 502*n*, the system may concatenate the representation of the bag to each of the negative examples/feature vectors 504. Notably, the system may first apply the transformation function to bag 502*n*, to determine a representation of bag 502*n* as a whole. In turn, the system may concatenate each of the feature vectors 504*n* in bag 502 with the resulting vector representation of bag 502*n*, to form training data 512*n*.

Said differently, if a bag has any positive examples of the classification label (e.g., one or more malicious flows, in the case of a traffic classifier), the system may extend only these feature vectors with the bag-level contextual information, to form the training data. However, if a given bag does not comprise any positive examples, the system may instead extend each of the feature vectors in the bag with the contextual information for that bag.

After forming training data 512, the system may then train a classifier using the extended feature space. Note that the non-malicious flows of positive bags are excluded from the training stage to avoid ambiguous labeling, to avoid a possibly negative example being enhanced with a positive bag representation. In the testing/evaluation phase, however, it does not matter how the combination: "a negative flow with a positive bag representation" is classified as long as at least one flow within the whole positive bag is classified as positive. In addition, even though non-malicious flows of positive bags are left from the training, information they carry is contained in the aggregated bag representation that is attached to at least one flow within the resulting training data.

Figure 6:
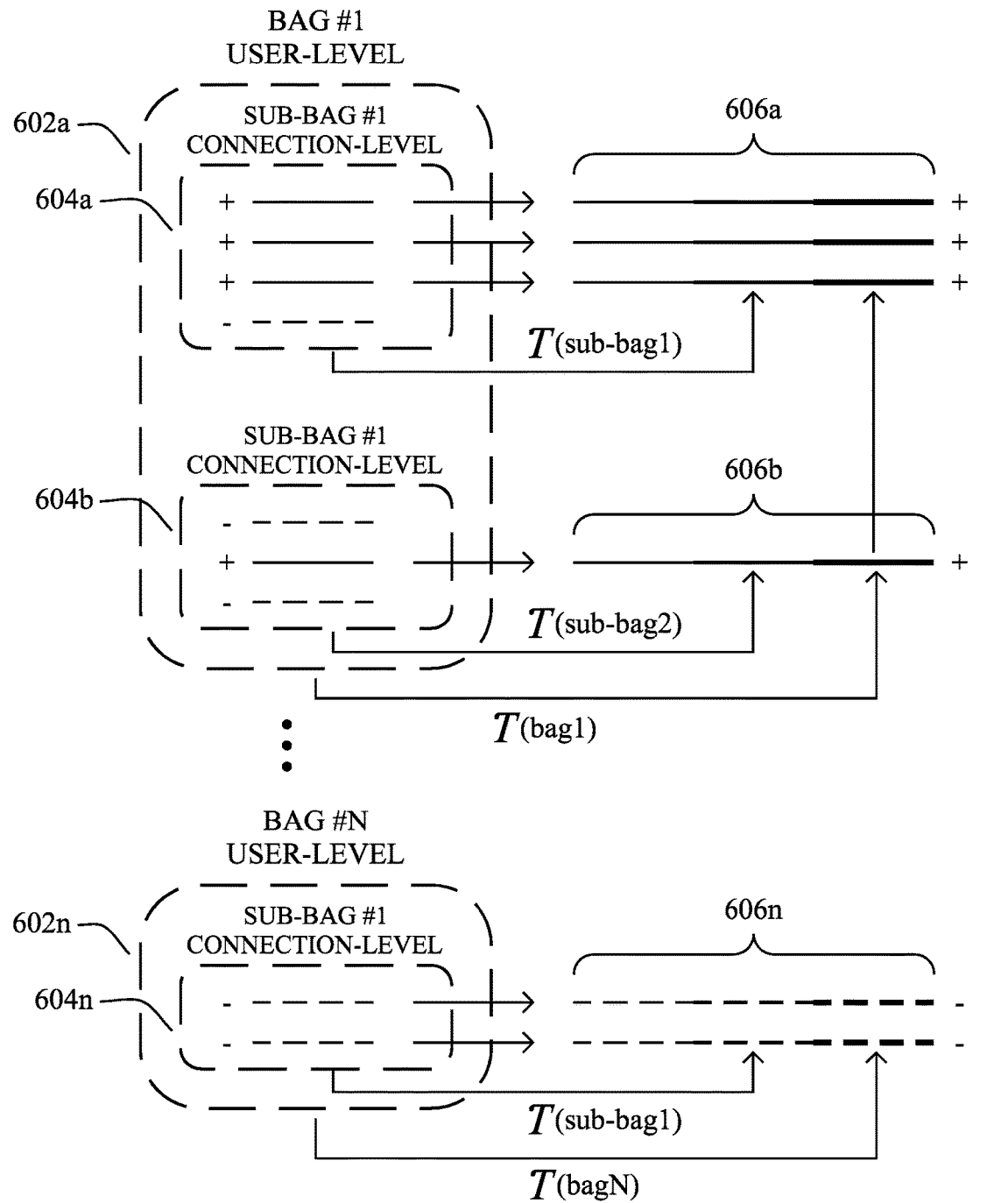
FIG. 6 illustrates an example of enriching a bag hierarchy.

FIG. 6 illustrates an example 600 of enriching a bag hierarchy using the techniques herein, according to various embodiments. As noted, the techniques herein are also applicable to cases in which the subject of classification can be expressed as a is hierarchy of bags. Behavioral modelling of network users is one such case. Specifically, it may entail using a two-level bag hierarchy, since every user can establish a set of connections within a time window, and each such connection is described by yet another set of flows. In this setting, the techniques herein can be used to enrich the flows with both: the connection-level and the user-level vector representations.

More specifically, each bag 602 shown in FIG. 6 may group feature vectors that represent traffic flows according to their user-level characteristics. For example, each of the feature vectors grouped in bag 602*a* may be associated with the same user or endpoint client device within a certain time window. However, not all of these flows may share the same connection-level characteristics. For example, the user may connect with very different domains within this time window. Accordingly, as shown, the feature vectors that share the same connection-level characteristics in bag 602*a* may be grouped into sub-bags 604*a* and 604*b*. This sub-bagging may be repeated for each of the N-number of bags 602.

According to various embodiments, the system may apply a transformation function to the feature vectors at both the sub-bag level, as well as at the bag level. For example, as shown, the system may apply the transformation function to the feature vectors in sub-bag 604*a*, as well as the full set of feature vectors in bag 602*a*. Similar to the approach illustrated in FIG. 5C, the system may append the resulting contextual information to the positive examples in a given bag, to form training data 606. For example, the positive examples in sub-bag 604*a* may be extended with the contextual information from sub-bag 604*a*, as well as the contextual information from bag 602*a*, to form training data 606*a*. More specifically, the system may extend the positive example feature vectors in sub-bag 604*a* with the results of applying the transformation function to sub-bag 604*a* and to bag 602*a* as a whole. A similar approach can be taken with sub-bag 604*b* in bag 602*a*.

Any bag 602 that comprises only negative example feature vectors, such as bag 602*n*, may be treated in a similar manner as in example 520 in FIG. 5C. Notably, the is system may apply the transformation function at both the sub-bag level (e.g., to the feature vectors in sub-bag 604*n*), as well as at the bag level of bag 602*n*, and then concatenate the positive example feature vectors in sub-bag 604*n* with these results, to form training data 606*n*.

While example 600 illustrates only a dual bag hierarchy, the techniques herein can also be applied to any number of levels of sub-bags. For example, other characteristics can be used to sub-group the feature vectors for the traffic flows in any number of ways, to form x-number of hierarchies within a single bag. Contextual information can then be added to the training data for each successive hierarchy, in further embodiments.

A prototype of the techniques herein was constructed and used to validate the techniques herein against different training methodologies. Notably, HTTP traffic data was collected from two distinct days that were also spaced by two months, Apr. 11, 2017 and Jun. 13, 2017. Each HTTP log record was then represented as a feature vector with 103 features (e.g., the length of URL query, the number of query parameters, occurrences of specific characters like !, @, #, -, /, =, ?, :, ;, in individual parts of URLs, and the like). The flows were further structured into two-level hierarchical bags according to three keys: username, domain, and 15 minute time window. To transform the (sub-)bags of flows into single vectors, a simple combination of four aggregation functions was used, whose results were then concatenated. The aggregation/transformation functions computed the following: maximum, mean, standard deviation and the number flows inside the bag.

As a result of the above bagging approach, the training data set comprised feature vectors of 103 features has dimension 3×103+1=310 features. Support Vector Machines (SVMs) with linear kernels were selected a classification model for the following three experiments:

Basic model—Single Instance Learning—The classifier trained on individual flows (103 features).

Double Enrichment (multiple instance learning only)—The classifier trained on is two concatenated multiple instance learning representations: connection-level and user-level (310+310=620 features).

Double Enrichment (combined approach)—The classifier trained on flows enriched by two multiple instance learning representations (103+310+310=723 features).

Figure 7:
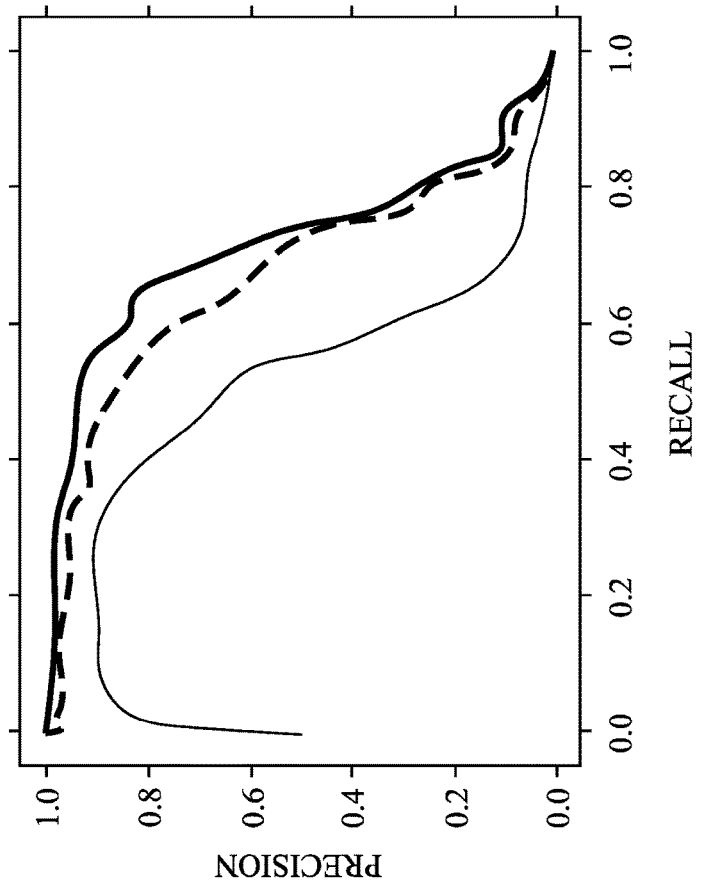
FIG. 7 illustrates an example plot of test results using the techniques herein.

FIG. 7 illustrates an example plot 700 of test results for the above three experiments using the techniques herein, according to various embodiments. Notably, plot 700 was generated by evaluating the trained models for the three experiments above on the users per 15 minute time window and with a dataset that comprised 14,704 malicious and 3,126,812 benign samples. As can be seen from plot 700, both of the double enrichment approaches outperformed the single instance learning approach, from both a precision and recall perspective.

Figure 8:
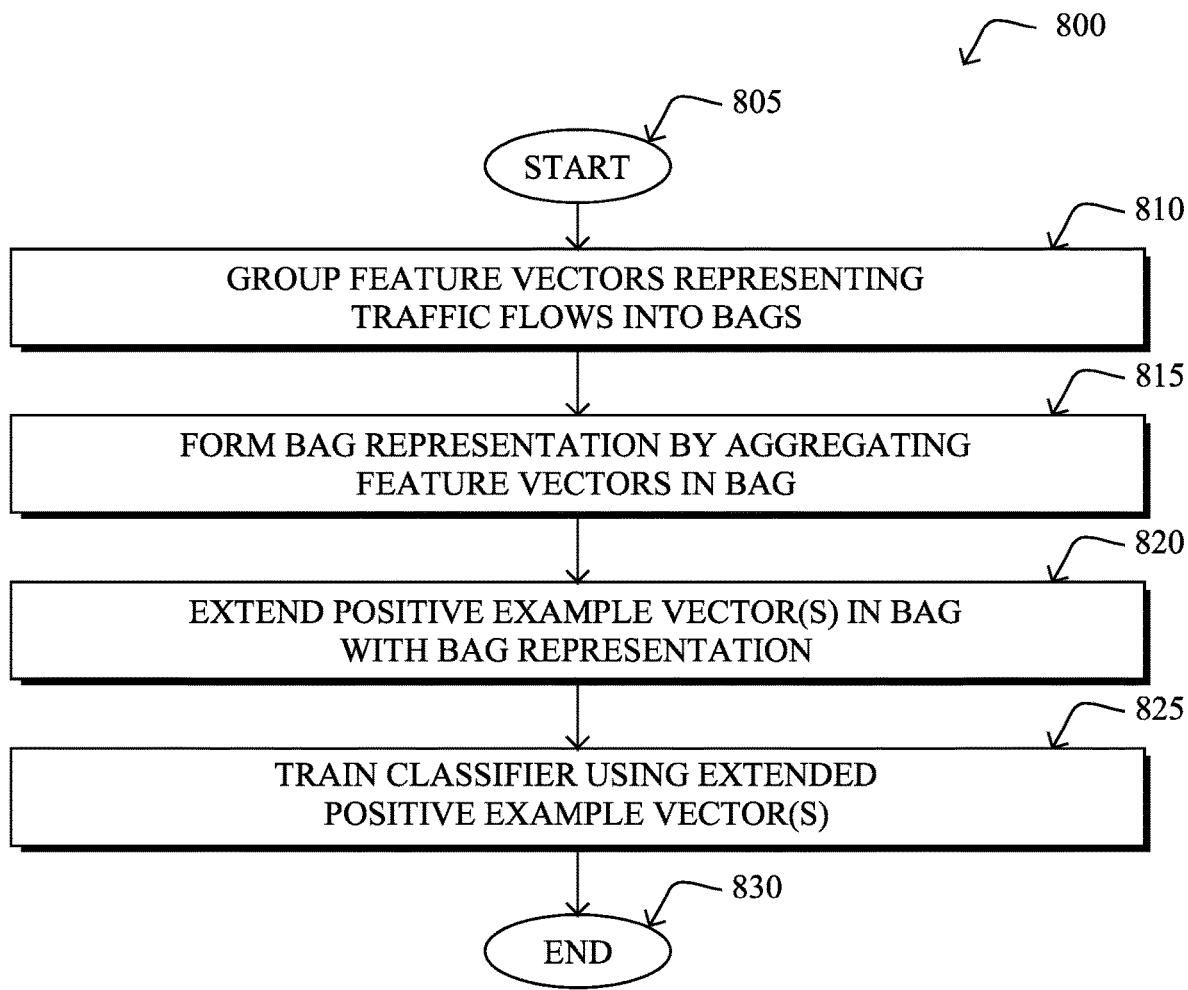
FIG. 8 illustrates an example simplified procedure for training a network traffic classifier.

FIG. 8 illustrates an example simplified procedure for training a network traffic classifier, in accordance with one or more embodiments described herein. For example, a non-generic, specifically configured device (e.g., device 200) may perform procedure 800 by executing stored instructions (e.g., process 248). The procedure 800 may start at step 805, and continues to step 810, where, as described in greater detail above, the device may group feature vectors representing network traffic flows into bags. In various embodiments, the device may form the feature vectors using any number of characteristics observed from the traffic flows such as, but not limited to, time window, user, endpoint client device, target domain, etc. These characteristics can then be used to group the feature vectors that share characteristics, such as grouping all traffic associated with a particular user identifier and from the same time window into a single bag.

At step 815, as detailed above, the device may form a bag representation of a particular one of the bags by aggregating the feature vectors in the bag. In various embodiments, this may entail the device applying an aggregation/transformation function to the feature vectors in the bag, such as to calculate the mean, max, min, or the like, of the feature vectors.

At step 820, the device may extend one or more feature vectors in the particular bag with the bag representation, as described in greater detail above. In various embodiments, the extended one or more feature vectors may be positive examples of a classification label for the network traffic. For example, in the case of training a classifier to detect malicious traffic, the feature vectors extended with the bag contextual information may represent traffic flows that have been deemed malicious.

At step 825, as detailed above, the device may train a network traffic classifier using training data that comprises the one or more feature vectors extended with the bag representation. For example, such a classifier may be trained to label a given traffic flow as either 'malicious' or 'benign.' In various embodiments, the device may then deploy the trained classifier to one or more networks. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for improved classification performance of other approaches, such as single and multiple instance learning. Notably, in contrast to single instance learning, all flows may be enhanced by the contextual bag representation increasing the classification performance. In addition, non-identified malicious flows in positives bags (e.g., the vectors labeled as '?' in FIGS. 5A-5C), are not mislabeled with the negative/benign label. Also, in contrast to basic multiple instance learning embedding approaches, the classifier may be trained on a larger number of positive examples, since every identified malicious flow can be leveraged for training. In addition, the malicious flows cannot be lost in bags with rich background activity, nor in bags where multiple malicious behaviors are mixed.

While there have been shown and described illustrative embodiments that provide is for training a classifier, it is to be understood that various other adaptations and modifications may be made within the spirit and scope of the embodiments herein. For example, while certain embodiments are described herein with respect to using certain models for purposes of traffic analysis, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
grouping, by a device, feature vectors representing network traffic flows into bags;
forming, by the device, a bag representation of a particular one of the bags by aggregating the feature vectors in the particular bag;

extending, by the device, one or more feature vectors in the particular bag with the bag representation, wherein the extended one or more feature vectors are only positive examples of a classification label for the network traffic;

training, by the device, a network traffic classifier using training data that comprises the one or more feature vectors extended with the bag representation;

identifying, by the device, one of the bags as including only negative examples of the classification label;

concatenating, by the device, each of the feature vectors in the identified bag with a bag representation of the identified bag; and including, by the device, the feature vectors concatenated with the bag representation of the identified bag in the training data used to train the classifier.

2. The method as in claim 1, wherein the trained classifier is configured to identify malicious traffic flows, and wherein the one or more feature vectors extended with the bag representation are positive examples of a malicious traffic flow classification label.

3. The method as in claim 1, further comprising:
deploying, by the device, the trained classifier to one or more networks.

4. The method as in claim 1, wherein grouping the feature vectors representing the network traffic flows into bags comprises:
forming, by the device, the feature vectors using measured characteristics of the network traffic flows; and
grouping, by the device, the feature vectors associated with the same host name, targeting domain, and time window into a single bag.

5. The method as in claim 1, wherein the bag representation of the particular bag comprises at least one of: a maximum, minimum, mean, or median of the feature vectors in the particular bag.

6. The method as in claim 1, further comprising:
excluding, by the device, one or more feature vectors in the particular bag that are negative examples of the classification label from the training data used to train the classifier.

7. The method as in claim 1, further comprising:
sub-dividing, by the device, the feature vectors in the particular bag into a set of sub-bags;
determining, by the device and for each of the sub-bags, a sub-bag representation of a sub-bag by aggregating the feature vectors in the sub-bag; and
extending, by the device, the one or more feature vectors in the particular bag that are positive examples of the classification label with the sub-bag representations of their respective sub-bags, wherein the training data used to train the classifier comprises the one or more feature vectors extended with the bag representation of the particular bag and the sub-bag representations of their respective sub-bags.

8. The method as in claim 7, wherein sub-dividing the feature vectors in the particular bag into the set of sub-bags comprises:
sub-dividing the feature vectors by common user information or connection information.

9. An apparatus, comprising:
one or more network interfaces to communicate with a network;
a processor coupled to the network interfaces and configured to execute one or more processes; and
a memory configured to store a process executable by the processor, the process when executed operable to:

group feature vectors representing network traffic flows into bags;
form a bag representation of a particular one of the bags by aggregating the feature vectors in the particular bag;
extend one or more feature vectors in the particular bag with the bag representation, wherein the extended one or more feature vectors are only positive examples of a classification label for the network traffic;
train a network traffic classifier using training data that comprises the one or more feature vectors extended with the bag representation;
identify one of the bags as including only negative examples of the classification label;
concatenate each of the feature vectors in the identified bag with a bag representation of the identified bag; and
include the feature vectors concatenated with the bag representation of the identified bag in the training data used to train the classifier.

10. The apparatus as in claim 9, wherein the trained classifier is configured to identify malicious traffic flows, and wherein the one or more feature vectors extended with the bag representation are positive examples of a malicious traffic flow classification label.

11. The apparatus as in claim 9, wherein the process when executed is further configured to:
deploy the trained classifier to one or more networks.

12. The apparatus as in claim 9, wherein the apparatus groups the feature vectors representing the network traffic flows into bags by:
forming the feature vectors using measured characteristics of the network traffic flows; and
grouping the feature vectors associated with common host names, targeting domains, and time windows into a single bag.

13. The apparatus as in claim 9, wherein the bag representation of the particular bag comprises at least one of: a maximum, minimum, mean, or median of the feature vectors in the particular bag.

14. The apparatus as in claim 9, wherein the process when executed is further configured to:
represent a second set of traffic flows as a second set of feature vectors;
form bags by grouping the second set of feature vectors;
extend the feature vectors in the second set with representations of the bags in which they are grouped; and
classify, using the trained classifier, the feature vectors in the second set extended with the representations of the bags in which they are grouped.

15. The apparatus as in claim 9, wherein the process when executed is further configured to:
sub-divide the feature vectors in the particular bag into a set of sub-bags;
determine, for each of the sub-bags, a sub-bag representation of a sub-bag by aggregating the feature vectors in the sub-bag; and
extend the one or more feature vectors in the particular bag that are positive examples of the classification label with the sub-bag representations of their respective sub-bags, wherein the training data used to train the classifier comprises the one or more feature vectors extended with the bag representation of the particular bag and the sub-bag representations of their respective sub-bags.

16. The apparatus as in claim 15, wherein the apparatus sub-divides the feature vectors in the particular bag into the set of sub-bags by:
　　sub-dividing the feature vectors by user information or connection information.

17. A tangible, non-transitory, computer-readable medium storing program instructions that cause a device in a network to execute a process comprising:
　　grouping, by the device, feature vectors representing network traffic flows into bags;
　　forming, by the device, a bag representation of a particular one of the bags by aggregating the feature vectors in the particular bag;
　　extending, by the device, one or more feature vectors in the particular bag with the bag representation, wherein the extended one or more feature vectors are only positive examples of a classification label for the network traffic;
　　training, by the device, a network traffic classifier using training data that comprises the one or more feature vectors extended with the bag representation;
　　identifying, by the device, one of the bags as including only negative examples of the classification label;
　　concatenating, by the device, each of the feature vectors in the identified bag with a bag representation of the identified bag; and
　　including, by the device, the feature vectors concatenated with the bag representation of the identified bag in the training data used to train the classifier.

* * * * *

UNITED STATES PATENT AND TRADEMARK OFFICE
CERTIFICATE OF CORRECTION

PATENT NO. : 11,271,833 B2  
APPLICATION NO. : 15/790402  
DATED : March 8, 2022  
INVENTOR(S) : Tomas Komarek et al.

Page 1 of 2

It is certified that error appears in the above-identified patent and that said Letters Patent is hereby corrected as shown below:

In the Specification

Column 1, Line 27, please amend as shown:  
For example, some traffic may seek to overwhelm a Column 2, Line 30, please amend as shown:  
nodes typically communicate over the network by Column 3, Line 45, please amend as shown:  
two links connected to the public Internet, with potentially Column 4, Line 18, please amend as shown:  
more mesh networks, such as an Internet of Things Column 4, Line 59, please amend as shown:  
physical media ( e.g., temperature or humidity changes, Column 5, Line 35, please amend as shown:  
or logic adapted to execute the software programs and Column 6, Line 53, please amend as shown:  
ground approach that uses a greatly reduced set of labeled Column 7, Line 27, please amend as shown:  
aged to capture information about traffic in a network. For Column 8, Line 2, please amend as shown:  
ments, the device may simply capture header information Signed and Sealed this  
Seventeenth Day of May, 2022

Katherine Kelly Vidal  
*Director of the United States Patent and Trademark Office*

CERTIFICATE OF CORRECTION (continued)
U.S. Pat. No. 11,271,833 B2

Column 8, Line 28, please amend as shown:
characteristics regarding message $r_i$:

Column 8, Line 34, please amend as shown:
request 404 of message $r_{i-1}$ and when client 400 sent Column 8, Line 39, please amend as shown:
may also capture other features regarding the traffic, as Column 9, Line 7, please amend as shown:
traffic flow classifiers. In some aspects, the techniques Column 10, Line 22, please amend as shown:
flows represented in bags 502. More specifically, as Column 10, Line 63, please amend as shown:
can be considered to be wasting valuable training samples Column 11, Line 37, please amend as shown:
each of the positive example feature vectors 504 ( e.g., the Column 12, Line 11, please amend as shown:
be expressed as a hierarchy of bags. Behavioral modelling Column 12, Line 50, please amend as shown:
manner as in example 520 in FIG. 5C. Notably, the system Column 13, Line 22, please amend as shown:
The classifier trained on two concatenated multiple Column 14, Line 36, please amend as shown:
embodiments that provide for training a classifier, it is to